United States Patent
Ho et al.

(10) Patent No.: US 7,263,387 B2
(45) Date of Patent: Aug. 28, 2007

(54) SPEAKER MODULE DESIGN

(75) Inventors: San-Chi Ho, Tao Yuan (TW);
Kar-Chai Luk, Tao Yuan (TW);
Teerada Sirirattanasit, Tao Yuan (TW)

(73) Assignee: High Tech Computer, Corp., Tao Yuan (TW)

( * ) Notice: Subject to any disclaimer, the term of this patent is extended or adjusted under 35 U.S.C. 154(b) by 491 days.

(21) Appl. No.: 10/423,772

(22) Filed: Apr. 24, 2003

(65) Prior Publication Data

US 2004/0142731 A1  Jul. 22, 2004

(30) Foreign Application Priority Data

Jan. 21, 2003  (TW) .............................. 92201050 U

(51) Int. Cl.
*H04M 1/00*  (2006.01)
(52) U.S. Cl. ................... 455/569.1; 381/345; 381/349; 381/351; 381/353; 381/354; 181/155; 181/156; 379/433.02
(58) Field of Classification Search ................ 381/345, 381/349, 351, 353, 354; 181/155, 156; 379/433.02
See application file for complete search history.

(56) References Cited

U.S. PATENT DOCUMENTS

| | | | | |
|---|---|---|---|---|
| 4,298,087 A | * | 11/1981 | Launay ........................ | 181/153 |
| 4,930,596 A | * | 6/1990 | Saiki et al. .................. | 181/152 |
| 6,411,719 B1 | * | 6/2002 | Moster et al. ............... | 381/345 |
| 6,819,946 B2 | * | 11/2004 | Hansson ................... | 455/569.1 |
| 6,922,471 B1 | * | 7/2005 | Marqvardsen et al. . | 379/433.02 |

* cited by examiner

*Primary Examiner*—Duc M. Nguyen
*Assistant Examiner*—Justin Lee
(74) *Attorney, Agent, or Firm*—J.C. Patents

(57) ABSTRACT

A speaker module (200) having a speaker unit (210) and a speaker box (220) is provided. The speaker module is mounted in a casing (22) of a hand-held electronic device (20). The speaker box (220) has a wall defining an aperture (222a) receiving the speaker unit therein. The speaker box has a neck section (224) formed by narrowing a peripheral wall of the speaker box. The neck section connects front and rear speaker chambers (222, 226) each of which has a cross-sectional dimension larger than that of the neck section. The speaker module is mounted on a printed circuit board (24) by fitting the neck section in a hole (24a) of the printed circuit board. The speaker unit is mounted in a front wall of the front chamber (222). An antenna module (26) is mounted in the casing behind the speaker module.

13 Claims, 2 Drawing Sheets

SPEAKER MODULE DESIGN

CROSS-REFERENCE TO RELATED APPLICATION

This application claims the priority benefit of Taiwan patent application serial no. 92201050, filed Jan. 21, 2003.

BACKGROUND OF THE INVENTION

1. Field of Invention

The present invention relates to a speaker module design. More particularly, the present invention relates to a speaker module for a hand-held electronic device.

2. Description of Related Art

In this information age, our reliance on electronic products can be seen everywhere. For example, we use mobile phones, computers and audio-visual products every day. As manufacturing techniques for electronic devices continue to advance, more personalized and multi-functional electronic products are available in the market. With big leaps in the communication industry, the mobile phone is becoming increasingly common in our society.

Starting out bulky and heavy, the first generation of mobile phones has transformed into slim and lightweight palm-top phones. Yet, most manufacturers are still researching methods to reduce the weight and size of existing mobile phones for greater portability. In the meantime, manufacturers are also trying hard to expand the function of each mobile phone and reduce as much as possible any harmful effects due to electromagnetic radiation, however small they actually are. However, reducing the size of an existing mobile phone involves a close matching of all the elements within the mobile phone including the location and size of a speaker box for housing a speaker unit. In fact, quality of sound emitted from the phone largely depends on the size of the speaker box. In general, a larger speaker box can obtain a better sound quality. Nevertheless, due to the miniaturization trend of the hand-held electronic device, a speaker box has a large size is no longer practical. Hence, how to devise a speaker box that can improve the sound quality while does not need to increase in size is an important topic for manufacturers of hand-held electronic devices.

FIG. 1 is a cross-sectional view showing major components and an internal structure of a conventional speaker module 100 inside a mobile phone 10. As shown in FIG. 1, the conventional speaker module 100 is installed inside a casing 12 of the mobile phone 10. The speaker module 100 mainly includes a speaker unit 110 and a speaker box 120. The speaker box 120 houses the speaker unit 110. Aside from serving as a sound-producing loudspeaker, the speaker unit 110 also functions as a buzzer with specialized response at high frequency. Furthermore, the speaker unit 110 can also function as a receiver. Thus, the speaker unit 110 in the mobile phone 10 serves three major functions altogether. In addition, the wall at one end of the speaker box 120 has an aperture 120a that accommodates the speaker unit 110. A printed circuit board 14 within the mobile phone 10 also has a hole 14a for fittingly receiving the entire speaker box 120 inside the casing 12. Therefore, the speaker module 100 consisting of the speaker unit 110 and the speaker box 120 is able to generate sound in an amplified manner. In general, an additional antenna module 16 is also set up between the casing 12 and the speaker box 120 for receiving and transmitting signals of the mobile phone 10.

When the mobile phone 10 is reduced in size, the speaker box 120 within the phone must be reduced correspondingly. As a result, the low frequency response of the speaker module 100 will deteriorate. Moreover, the cost of producing a miniaturized speaker unit 110 capable of serving as a loudspeaker, a buzzer and a receiver is especially high. All in all, the cost of producing the mobile phone 10 will be increased.

SUMMARY OF THE INVENTION

Accordingly, one object of the present invention is to provide a speaker module having a speaker box consisting of two speaker chambers connected together through a neck section. The speaker box so constructed is able to increase the specified high frequency and low frequency response of output sound and decrease an area of a printed circuit board needed to be punctured in order to mount the speaker box so that area utilization of the printed circuit board is improved.

To achieve the above and other objects and in accordance with the purpose of the invention, as embodied and broadly described herein, the invention provides a speaker module. The speaker module includes a speaker unit and a speaker box. The wall at one end of the speaker box has an aperture for mounting the speaker unit. The speaker box has at least a neck section formed by narrowing a peripheral wall of the speaker box.

According to the aforementioned embodiment of this invention, the speaker box further includes a front and rear speaker chamber. The neck section is located between and connects the front and rear speaker chambers. The speaker unit is mounted in an aperture in a front wall of the front speaker chamber.

This speaker module is used for a handheld electronic device. The electronic device has a printed circuit board with a hole. The speaker module is mounted to the printed circuit board with the neck section of the speaker box fitted in the hole of the printed circuit board.

In brief, the speaker module of this invention has a speaker box structure that differs from the conventional design. The speaker box of this invention has a neck section formed by narrowing a peripheral wall of the speaker box whereby the speaker box forms two speaker chambers connected by the neck section located between the two speaker chambers. By adjusting length and cross-sectional dimension of the neck section, high and low frequency responses of the speaker box can be improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate an embodiment of the invention and, together with the description, serve to explain the principles of the invention. In the drawings.

DESCRIPTION OF THE PREFERRED EMBODIMENT

Figure 1:
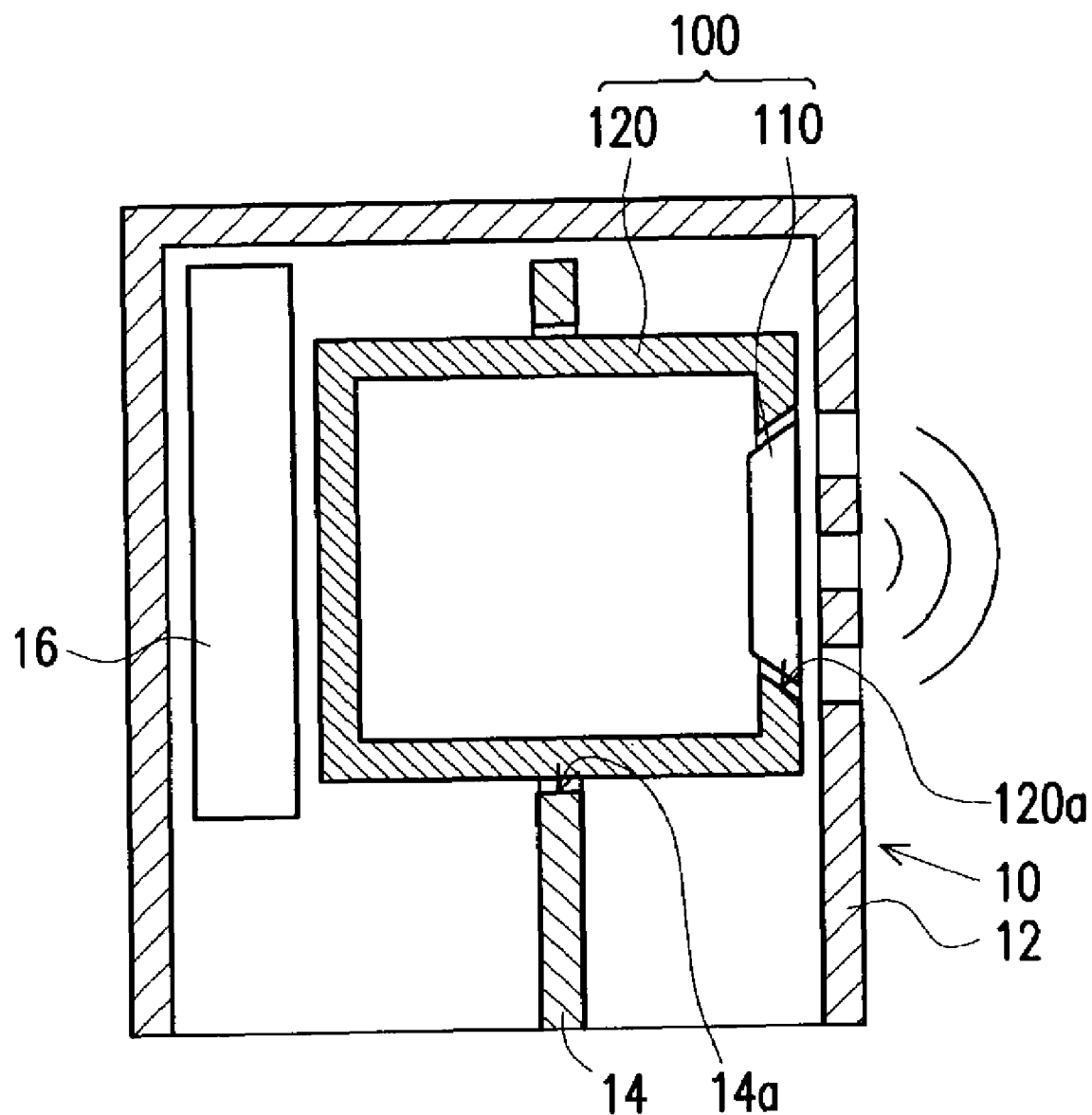
FIG. 1 is a cross-sectional view showing major components and an internal structure of a conventional speaker module inside a mobile phone.

Reference will now be made in detail to the present preferred embodiment of the invention, an example of which is illustrated in the accompanying drawing. Wherever possible, the same reference numbers are used in the drawings and the description to refer to the same or like parts.

Figure 2:
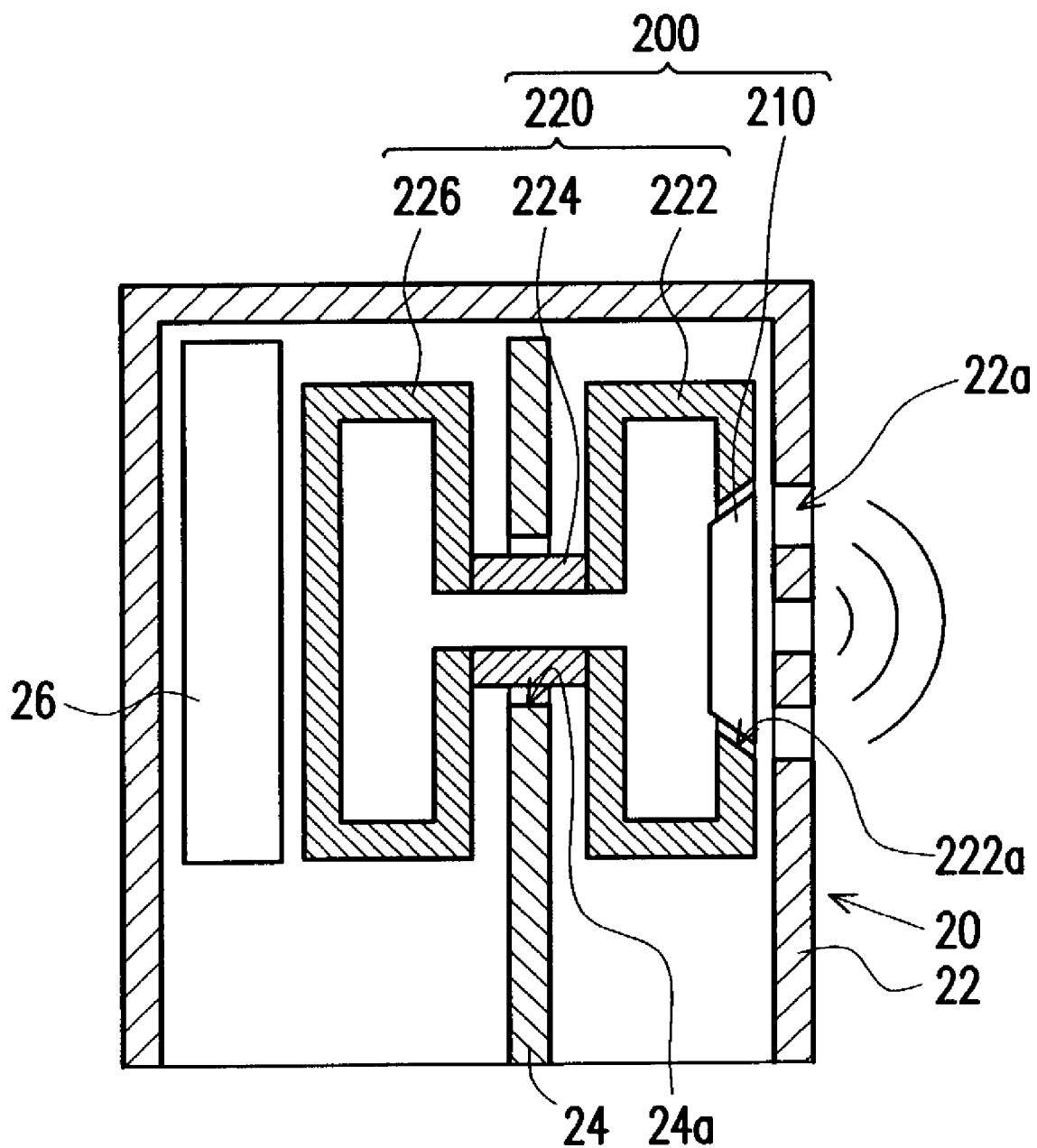
FIG. 2 is a cross-sectional view showing major components and an internal structure of a speaker module inside a mobile phone according to one preferred embodiment of this invention.

FIG. 2 is a cross-sectional view showing major components and an internal structure of a speaker module 200 inside a mobile phone 20 according to one preferred embodiment of this invention. As shown in FIG. 2, the speaker module 200 is enclosed within a casing 22 of the mobile phone 20. Aside from the mobile phone 20, the speaker module 200 may be installed inside a palm-top device such as a personal digital assistant (PDA) or a hand-held games console. The speaker module 200 mainly comprises a speaker unit 210 and a speaker box 220. Note that the mobile phone 20 normally has a printed circuit board 24 with a hole 24a for mounting the speaker box 220.

The speaker box 220 mainly includes a front speaker chamber 222, a neck section 224 and a rear speaker chamber 226. The front speaker chamber 222 has a front wall (not labeled) defining an aperture 222a therein. The speaker unit 210 is mounted into the aperture 222a. The neck section 224 is firstly brought to fit in the hole 24a of the printed circuit board 24. The front speaker chamber 222 and the rear speaker chamber 226 are then securely attached to front and rear ends (not labeled) of the neck section 224, respectively. In other words, the front speaker chamber 222 and the rear speaker chamber 226 are connected together through the neck section 224 and hence the overall volume of the speaker box 220 is the combined volume of the front speaker chamber 222, the neck section 224 and the rear speaker chamber 226. A combination of the printed circuit board 24 and the speaker module 200 is put into the casing 22. Thereafter, an antenna module 26 is also inserted in the casing 22 at a position behind the rear speaker chamber 226. The antenna module 26 is used for receiving and transmitting signals of the mobile phone 20. The casing 22 defines a plurality of holes 22a therein. The speaker unit 210 is located just behind these holes 22a after the speaker unit 210 is mounted in the casing 22 so that sound generated by the speaker unit 210 can easily transmit through the casing 22 via these holes 22a.

Since the speaker box 220 is a structure that includes two speaker chambers 222, 226 connected through the neck section 224, the front and rear speaker chambers 222, 226 can expand in a direction parallel to the printed circuit board 24 (expand vertically upward and downward according to FIG. 2) for increasing the volume of the speaker box 220 without increasing the size of the hole 24a. Because overall volume of the speaker box 220 is positively related to the low frequency response of the speaker module 200, the special design of the speaker box 220 is able to improve sound quality at low frequency. Therefore, by dividing the conventional speaker box into the two speaker chambers 222 and 226 linked by the neck section 224, the speaker box 220 can have sufficient volume to provide a required low frequency response, while the valuable estate of the printed circuit board 24 can be reserved for circuitry layout.

Furthermore, the provision of the neck section 224 of the speaker box 220 can improve the performance of high frequency output response of the speaker module 200.

To verify the improvement of high frequency response of the speaker module 200, a test is conducted. During the test, diameter and length of the neck section 224 are changed to obtain different results regarding the frequency of output sound and value of standard sound pressure level (ΔSPL). The testing parameters include: an input frequency ranging 100 hz~20 khz, the front speaker chamber 222 having a volume of 1.6 cc, the rear speaker chamber 226 having a volume of 4 cc, an input power to the speaker unit 210 rating 1 Watt and a distance between a reception point and the speaker unit 210 being 1 cm. A result of the test is listed in Table 1 below.

TABLE 1

| Diameter D (m) | Length L (m) | Maximum frequency f(Hz) | ΔSPL (dB) |
|---|---|---|---|
| 0.004 | 0.004 | 2175 | 17.54 |
|  | 0.005 | 2087 | 23.31 |
|  | 0.006 | 2013 | 19.38 |
| 0.005 | 0.004 | 2450 | 14.62 |
|  | 0.005 | 2350 | 24.39 |
|  | 0.006 | 2267 | 18.93 |
| 0.006 | 0.004 | 2721 | 13.42 |
|  | 0.005 | 2610 | 23.71 |
|  | 0.006 | 2518 | 16.62 |

In this invention, the speaker module 200 uses a neck section 224 to connect front and rear speaker chambers 222, 226. By adjusting cross-sectional diameter D and length L of the neck section 224, the speaker module 200 can generate sound at the frequency ranging 2 k~3 kHz at a standard pressure level between 13.42~24.39 dB. Hence, performance of high frequency response achieved by the speaker module 220 is improved.

As shown in FIG. 2, one major characteristic of this invention is in the speaker box 220. The speaker box 220 has a neck section 224 located between and connecting the front and rear speaker chambers 222, 226. In other words, the neck section 224 of the speaker box 220 results from a narrowing of a peripheral wall of the speaker box 220. Note that the neck section 224 of the speaker box 220 is fitted in the hole 24a of the printed circuit board 24 so that the front and rear speaker chambers 222, 226 of the speaker box 220 are located in front and rear of the printed circuit board 24, respectively. This arrangement enables the hole 24a in the printed circuit board 24 needed to mount the speaker box 220 to be relatively small, and hence increases the circuit layout area of the printed circuit board 24.

In conclusion, the speaker module 200 of this invention includes at least the following advantages:

1. The speaker box 220 of the speaker module 200 has a neck section 224 linking up two speaker chambers 222, 226. The speaker box 220 is mounted to a printed circuit board 24 by fitting the neck portion 224 in a hole 24a of the printed circuit board 24. The speaker chambers 222, 226 are located on front and rear faces of the printed circuit board 24, respectively, so that they can expand in a direction parallel to the printed circuit board 24. By expanding the speaker chambers 222, 226 in a direction parallel to the printed circuit board 24, an overall volume of the speaker box 220 can be increased and low frequency response of the speaker module 200 can be improved, while an area of the hole 24a of the printed circuit board 24 for mounting the speaker box 220 does no need to increase.

2. The speaker module 200 utilizes the neck section 224 of the speaker box 220 to increase the high frequency response.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A speaker module comprising:
a speaker unit; and
a speaker box having a wall defining an aperture receiving the speaker unit therein, wherein the speaker box has a neck section and two speaker chambers, the neck section located between and connecting the two speaker chambers, and the neck section is configured for securing the two speaking chambers as a whole, the two chambers as a whole having only one opening at the aperture.

2. The speaker module of claim 1, wherein one of the two speaker chambers has the wall defining the aperture receiving the speaker unit therein.

3. An electronic device comprising:
a printed circuit board defining a hole therein; and
a speaker module comprising:
  a speaker unit; and
  a speaker box having a wall defining an aperture receiving the speaker unit therein, wherein the speaker box has at least a neck section formed by a narrowing of a peripheral wall of the speaker box and two speaker chambers interconnected by the neck section, the neck section fitting through the hole of the printed circuit board and the two speaker chambers extending on two faces of the printed circuit board, respectively.

4. The electronic device of claim 3, wherein one of the two speaker chambers has the wall defining the aperture receiving the speaker unit therein.

5. The electronic device of claim 4 further comprising a casing enclosing the printed circuit board and the speaker module.

6. The electronic device of claim 5, wherein the casing has a plurality of holes located near the speaker unit so that sound generated by the speaker unit can easily transmit through the casing via the holes of the housing.

7. The electronic device of claim 3, wherein the neck section is configured for securing the two speaking chambers as a whole.

8. A handheld device comprising:
a casing; and
a speaker module mounted in the casing and comprising:
  a speaker box having front and rear speaker chambers and a neck section located between and connecting the two speaker chambers;
  a speaker unit mounted in a wall of the front chamber, wherein the neck section is configured for securing the two speaking chambers as a whole onto the casing; and
  a printed circuit board, and the speaker module is mounted to the printed circuit board with the neck section of the speaker box fitted through the printed circuit board.

9. The handheld device of claim 8, wherein the speaker unit is mounted to a front wall of the front chamber.

10. The handheld device of claim 9 further comprising an antenna module mounted in the casing behind the rear speaker chamber of the speaker box.

11. The handheld device of claim 9, wherein the front and rear speaker chambers extend parallel in front and rear of the printed circuit board, respectively.

12. The handheld device of claim 9, wherein the casing defines a plurality of holes and the speaker unit is located behind the plurality of holes so that sound generated by the speaker unit can transmit through the casing via the holes.

13. A mobile phone having a casing and a speaker module received in the casing, the speaker module comprising:
a speaker unit; and
a speaker box having a wail defining an aperture receiving the speaker unit therein, wherein the speaker box has a neck section and two speaker chambers, the neck section located between and connecting the two speaker chambers, and the neck section is configured for securing the two sneaking chambers as a whole onto the casing, wherein the two chambers as a whole having only one opening at the aperture.

* * * * *